United States Patent [19]

Balyasny et al.

[11] Patent Number: 4,743,088
[45] Date of Patent: May 10, 1988

[54] OPTICAL FIBER RELEASABLE CONNECTOR BACKSHELL

[76] Inventors: Marik Balyasny, 7358 Ruffner Ave., Van Nuys, Calif. 91406; Douglas A. Parker, 2179 Farnworth St., Camarillo, Calif. 93010

[21] Appl. No.: 678,873

[22] Filed: Dec. 6, 1984

[51] Int. Cl.[4] .............................. G02B 6/36; G02B 7/26
[52] U.S. Cl. .................................. 350/96.20; 350/96.21
[58] Field of Search ................ 350/96.20, 96.21, 96.23

[56] References Cited

U.S. PATENT DOCUMENTS 4,281,892  8/1981  Sitabkhan ........................ 350/96.21
4,548,465 10/1985  White ............................. 350/96.20

Primary Examiner—Robert E. Wise

[57] ABSTRACT

The backshell construction is identical for use with either a plug or receptacle fiber optics connector part and includes a short mounting sleeve threaded onto the rear of the connector part with a central bore facing outwardly of the connector and a central axis aligned with the logitudinal axis of the connector part. A second mounting sleeve fits into the end of a clamp which is received on the optical fiber cable. One or more fiber optics from the cable extend between the first and second mounting sleeve means and through a cylindrical extension tube. A sufficient length of the optical fibers are coiled or loosely curved within the extension tube to provide the desired strain relief, as well as storage of a sufficient length for retermination, if needed.

2 Claims, 3 Drawing Sheets

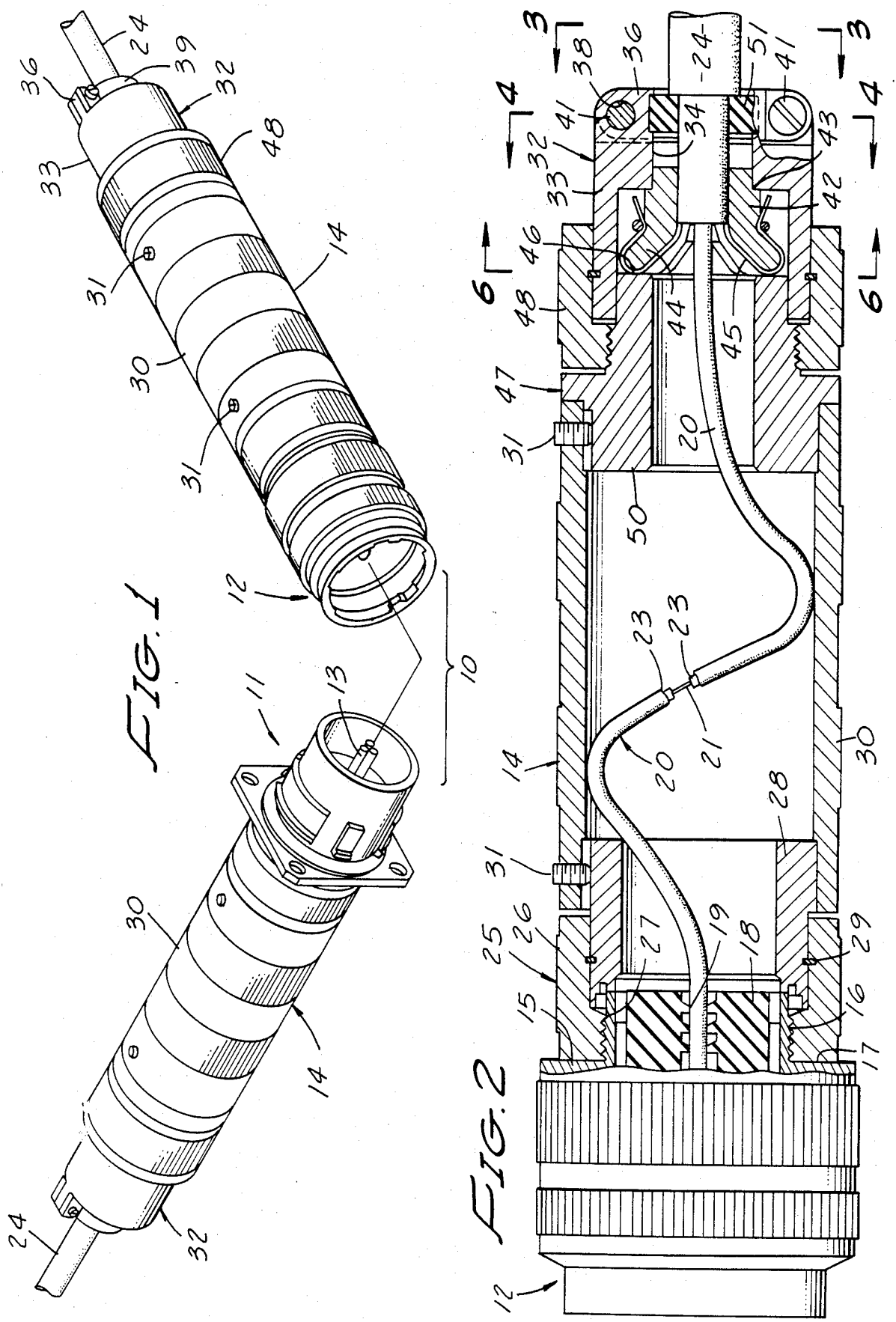

OPTICAL FIBER RELEASABLE CONNECTOR BACKSHELL

The invention relates generally to an optical fiber releasable connector, and, more particularly, to a backshell for the connector which provides both optical fiber strain relief and fiber storage means in the event retermination is required.

BACKGROUND

Fibers constructed of glass or plastic are widely used for transmitting optical signals and when used for that purpose are referred to as optical fibers. On occasion, it is necessary either to interconnect two fibers or to repair a broken fiber in a manner that will not substantially impair the transmission of an optical signal across the fiber junction. A satisfactory connector for this purpose must maintain two optical fibers having their ends faced off precisely at right angles in a slightly spaced end-opposed relation. An excellent fiber optic connector is that disclosed in copending U.S. patent application Ser. No. 586,391, RELEASABLE CONNECTOR FOR OPTICAL FIBERS by M. Balyasny and D. A. Parker filed on Mar. 5, 1984. In this connector, plug and receptacle parts each contain a three-pin fiber holder including one of the fibers to be connected and one of the connector parts is further provided with an alignment sleeve. The two connector parts when fitted together locate both of the three rod holders within the alignment sleeve and the connector parts are mated and unmated by rotating a coupling ring on one of the parts. The connector parts are not twisted or screwed on one another which could damage the optical fiber cables, but rotation of the coupling ring pulls the connector parts together or apart depending on the direction of rotation.

A continuing matter of concern in the use of a fiber optics connector is to insure that a sufficient amount of strain relief for the fiber optic cable be provided regardless of the number of individual signal lines contained in the cable, since stretching or twisting of the fibers can destroy their effectiveness of use. It is also desirable to provide a service length or loop of the fiber cable immediately adjacent the connector to allow for at least one further retermination.

SUMMARY OF THE INVENTION

The fiber optic connector with which the backshell to be described can be advantageously employed includes plug and receptacle parts which are telescopingly fitted together to properly locate two fibers in signal transmitting condition. A coupling ring carried by the plug connector part is rotatable to drive the plug and receptacle together or apart depending upon the direction of rotation. Each of these parts consists of generally cylindrical metal shells, one end of which receives a fiber optic cable having one or more optical fibers.

The backshell construction is identical for each of the connector parts and includes relatively short mounting sleeve means which are threaded onto the rear of the connector part and has a central bore that faces outwardly of the connector with a central axis aligned with the longitudinal axis of the connector part. Second relatively short mounting sleeve means are fitted into the end of a clamp which is received onto the optical fiber cable. The one or more fiber optics from the cable extend between the first and second mounting sleeve means and through a cylindrical extension tube. A sufficient length of the optical fibers are coiled or loosely curved within the extension tube to provide the desired strain relief, as well as storage of a sufficient length for retermination, if needed. On properly locating the storage length of the fiber optics cable within the extension tube (e.g., coiling) the extension tube is then affixed to each of the mounting sleeve means by threaded members, for example.

DESCRIPTION OF THE DRAWING

FIG. 1 is a perspective view of an unmated fiber optic connector showing each of the connector parts provided with a backshell in accordance with the present invention.

FIG. 2 is a side elevational, sectional, partially fragmentary, view of a backshell shown mounted on a connector part and fiber optic cable.

DESCRIPTION OF A PREFERRED EMBODIMENT

Figure 3:
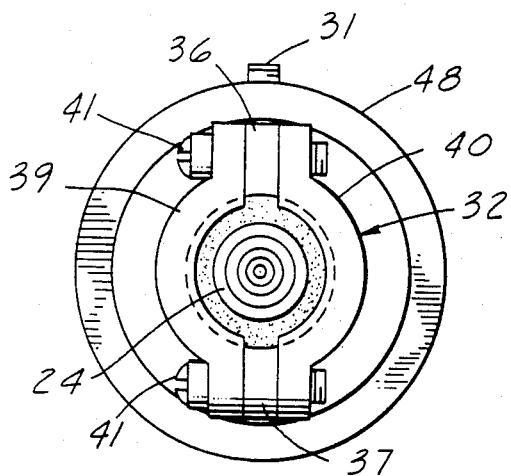
FIG. 3 is an end elevational view taken along the lines 3—3 of FIG. 2.
Figure 4:
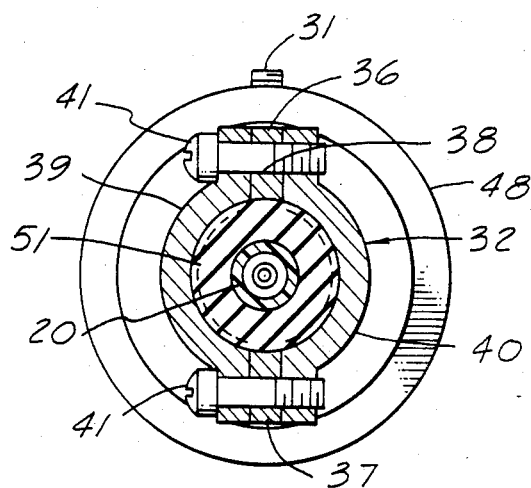
FIG. 4 is an end elevational, sectional view taken along the line 4—4 of FIG. 2.

In FIG. 1, an optical fiber cable connector identified generally as at 10 is seen to include a receptacle 11 and plug 12 which on being fitted together interconnect a pair of fiber optic holders such as a three-rod holder 13 in proper arrangement so that an optical signal may be transmitted between one or more pairs of optical fibers. Each of the connector parts 11 and 12 includes a backshell assembly 14 constructed and functioning in a manner to be described.

Turning now to FIG. 2, the cable entrance end of the connector part for either a receptacle 11 or plug 12 is seen to include a generally hollow cylindrical shell 15 having a set of threads 16 on its outer circumferential periphery and a radially outwardly extending shoulder 17 defining the inner limit of the thread 16. An insulative insert 18 or grommet seal received within the connector part shell bore has a plurality of passageways 19 for individually receiving an individual optical fiber 20.

A jacketed optical fiber 20 has a glass or plastic fiber core 21 with a cladding 22 which is arranged coaxially concentric within an outer protective covering 23. As is well known in the art an optical signal applied to one end of the fiber core 21 is transmitted along the full length of the fiber. Typically, a cable may consist of many jacketed optical fibers 20 enclosed by a further jacket or outer covering.

Mounting sleeve means 25 has a cylindrical shell 26 with internal threads 27 enabling threaded receipt of the threaded outer end of the connector part shell 15. A second cylindrical shell 28 has an outer diameter such as to enable fitting receipt within the non-threaded end of shell 26. The inner end of shell 28 abuts against an internal shoulder on shell 26 and the two shells are unitarily related by a ring 29, for example.

An elongated open-ended extension tube or sleeve 30 has one end received onto the outer end portion of shell 28 and secured thereto by one or more threaded members 31.

Figure 5:
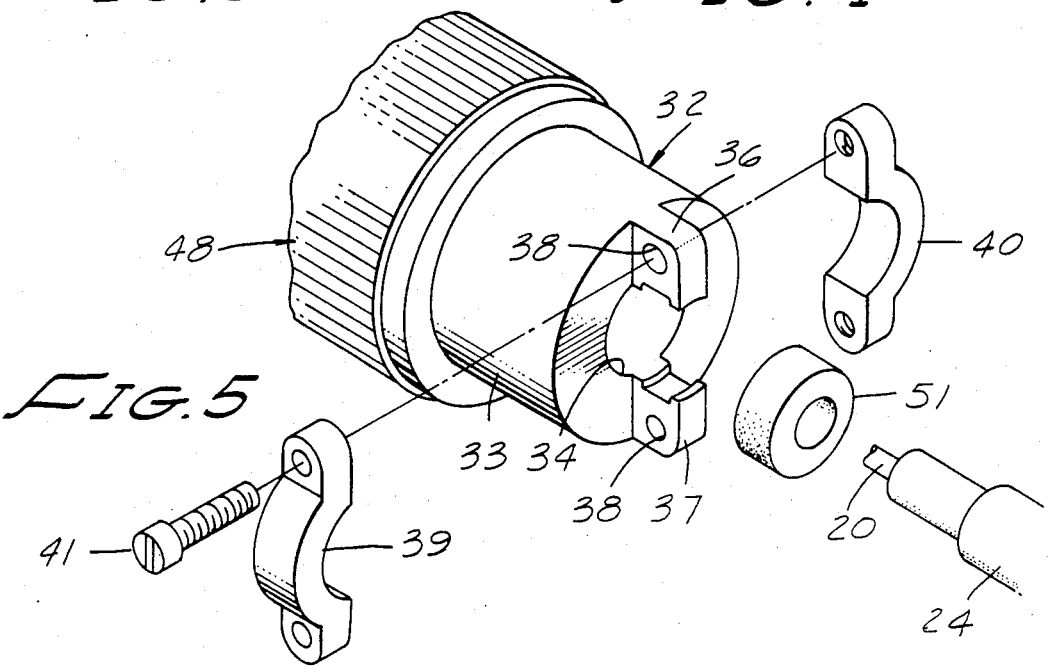
FIG. 5 is an exploded perspective view of a cable clamp for affixing the backshell to the fiber optic cable.
Figure 6:
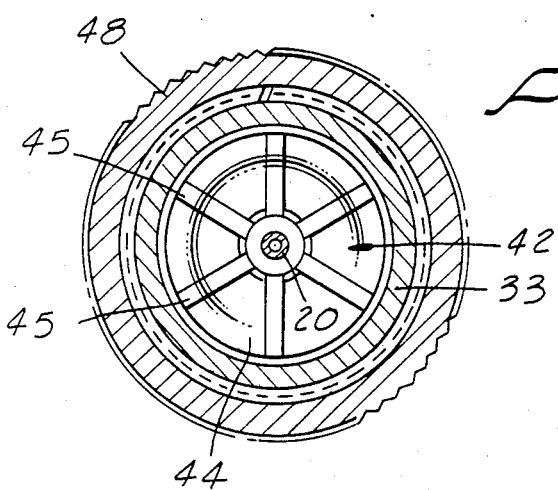
FIG. 6 is an end elevational, sectional view taken along the line 6—6 of FIG. 2.
Figure 7:
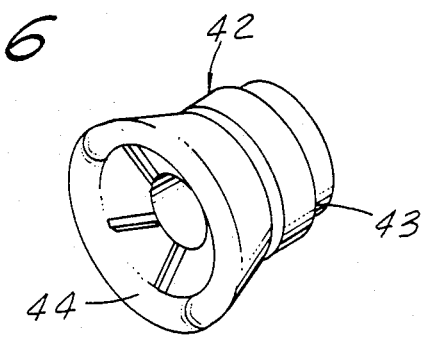
FIG. 7 is a perspective view of a clamp member.
Figure 8:
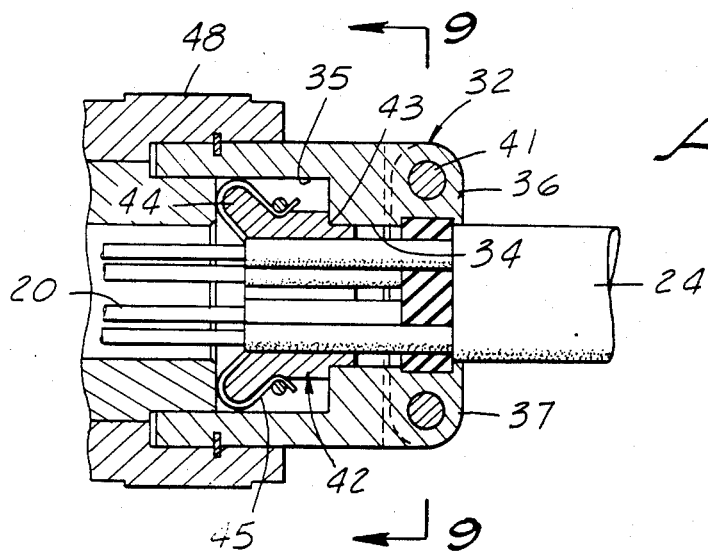
FIG. 8 is a side elevational, sectional view of the clamp member of FIG. 7 assembled onto a fiber optic cable.
Figure 9:
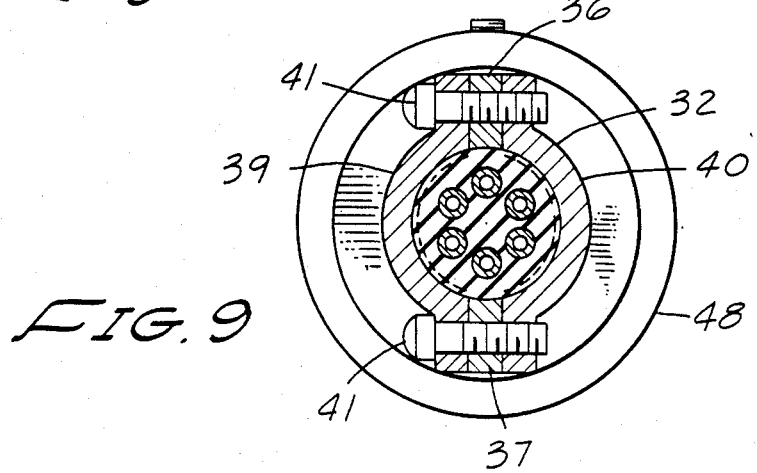
FIG. 9 is an end elevational, sectional view taken along line 9—9 of FIG. 8.
Figure 10:
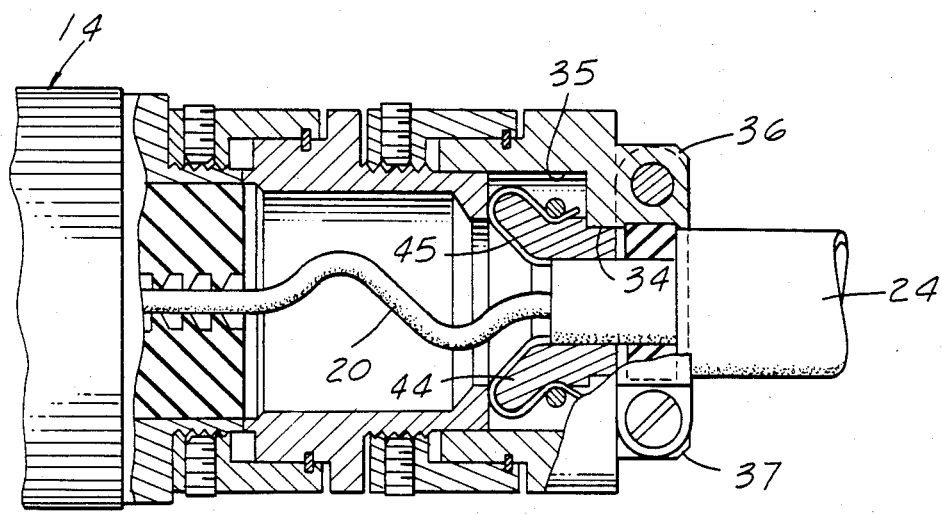
FIG. 10 is a side elevational, sectional view of an alternate embodiment similar to FIG. 2.

A cable clamping member 32 includes a generally cylindrical shell 33 having a relatively small axial opening 34 at one end and a relatively large axial opening 35 at the other end. A pair of axially extending mounting ears 36 and 37 are integral with the end wall of shell 33 and located at opposite sides of the small opening 34 (FIG. 5). Transverse openings 38 are formed in the mounting ears. Two clamping bars 39, 40 having curved side walls are adjustably positionable on the mounting ears 36 and 37 by bolts 41 to clampingly secure the cable 24 within the shell 33.

An annular cable collar 42 has a recessed cicumferential shoulder 43 for fitting receipt on an internal shoulder of the shell 33, the collar bore being collinear with the axis of openings 34 and 35. Flared edges 44 of the collar 42 have grooves on the conical rounded surface which accept portions of cable outer protective material 45 distributed approximately equally about the cable axis and flaring outwardly. Collar 42 is compressed against the end 48 of sleeve 47 capturing the cable protective material tightly, and, in that way, prevent rearward slippage of the proective material, and, consequently, that of the cable. This construction insures that tensile forces are absorbed by the cable protective material leaving the buffered fibers 20 free of tensile loadings.

An enlarged internally threaded fitting 46 is secured onto the cable clamping member shell 33 and receives a cylindrical sleeve 47 threaded within its open end. The end 48 of the sleeve 47 abuts against the flared edges 44 firmly clamping the cable outer protective material therebetween. The outer end portion 49 is dimensioned to fittingly receive the open end of the extension tube 30 thereon.

In assembly of the described apparatus, the cable 24 first has its outermost protective layer removed for a sufficient length from the end and the individual fibers are passed through a grommet 50, collar 42, sleeve 47 and extension tube 30 (the latter may or may not be secured to sleeve 47 by threaded member 31). Bolts 41 then secure the clamping bars 39 and 40 about the grommet 50 and included cable. The terminated optical fiber ends are entered into openings 19 of the connector part insert 18 and fastened therein by retaining clips. The central part of the optical fibers is looped or coiled within the extension tube 30 after which the tube is secured onto the shell 28 by threaded member 31 and onto sleeve 47, if the latter had not already been accomplished. Finally, the front shell 26 is threaded onto the rear portion of the connector part (either plug or receptacle) until the serrations on both parts are fully engaged.

What is claimed is:

1. A backshell arrangement for an optical fiber connector having a hollow connector part shell through which at least one optical fiber of a fiber cable and having cable protective material peeled back passes, comprising:

cable clamping means including a cylindrical shell with an internal shoulder, a grommet received within the cylindrical shell, mounting ear means integral with said cylindrical shell, clamping bar means, and bolt means for securing the clamping bar means to said cylindrical shell;

means for releasably securing the cable protective material to the clamping means including a collar with flared edges located within the clamping means cylindrical shell and one end abutting against the internal shell, and a sleeve threaded onto the cable clamping means for bearing against the collar flared edges;

an extension tube having one end affixed onto the cable securing means; and mounting sleeve means affixed to both the other end of the extension tube and the end portion of the plug shell, said mounting sleeve means including first and second shells telescopingly secured together, the first shell being received within the open end of the extension tube and the second shell being threaded onto the connector part shell.

2. A backshell arrangement as in claim 1, in which an outer end portion of the sleeve means is threaded onto the cable clamping means and is of reduced diameter for receiving the extension tube thereon, and there is further provided threaded means for securing the extension tube to said sleeve means.

* * * * *